(12) United States Patent
Kim

(10) Patent No.: US 10,739,818 B2
(45) Date of Patent: Aug. 11, 2020

(54) ELECTRONIC DEVICE AND METHOD FOR DRIVING THE SAME

(71) Applicant: Samsung Display Co., Ltd., Yongin-Si, Gyeonggi-Do (KR)

(72) Inventor: Taewook Kim, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 68 days.

(21) Appl. No.: 16/205,781

(22) Filed: Nov. 30, 2018

(65) Prior Publication Data
US 2019/0180721 A1    Jun. 13, 2019

(30) Foreign Application Priority Data

Dec. 12, 2017  (KR) ................. 10-2017-0170436

(51) Int. Cl.
*G06F 1/16*        (2006.01)
*G06F 3/147*       (2006.01)
*G09G 5/38*        (2006.01)

(52) U.S. Cl.
CPC .............. *G06F 1/163* (2013.01); *G06F 3/147* (2013.01); *G09G 5/38* (2013.01); *G09G 2340/0464* (2013.01); *G09G 2354/00* (2013.01); *G09G 2380/02* (2013.01)

(58) Field of Classification Search
CPC ........ G06F 3/147; G06F 1/163; G06F 1/1652; G09G 5/38; G09G 2340/0464; G09G 2354/00; G09G 2380/02
See application file for complete search history.

(56) References Cited

U.S. PATENT DOCUMENTS

| | | | |
|---|---|---|---|
| 2012/0229395 A1 | 9/2012 | Shin | |
| 2014/0098037 A1* | 4/2014 | Lee | G06F 3/041 345/173 |
| 2014/0125604 A1* | 5/2014 | Lee | G06F 3/0416 345/173 |
| 2015/0154936 A1* | 6/2015 | Lee | G09G 5/006 345/173 |
| 2016/0370881 A1* | 12/2016 | Jung | G06F 1/163 |

FOREIGN PATENT DOCUMENTS

KR    1020170076471 A    7/2017
KR      101803502 B1    12/2017

* cited by examiner

*Primary Examiner* — David Tung
(74) *Attorney, Agent, or Firm* — Cantor Colburn LLP

(57) ABSTRACT

An electronic device includes a flexible display panel, an input sensing panel, and a control module which controls the flexible display panel and the input sensing panel. The flexible display panel includes a display surface extending in a second direction and a rear surface disposed opposite to the display surface in a thickness direction. The input sensing panel includes a first portion disposed on the display surface, a second portion extending from the first portion and disposed on the rear surface, and a third portion extending from the first portion, disposed on the rear surface, and spaced apart from the second portion on the rear surface.

18 Claims, 16 Drawing Sheets

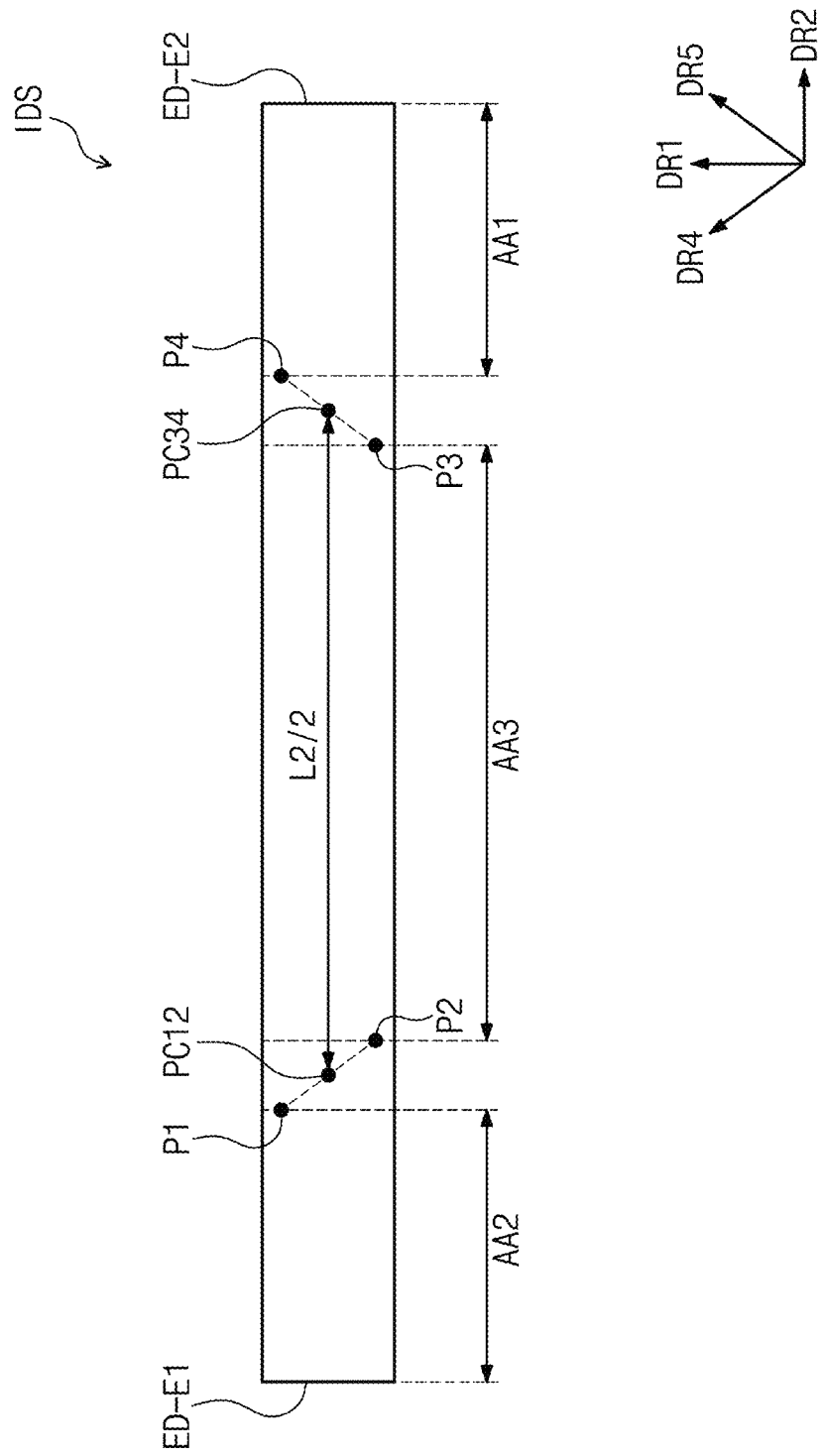

ELECTRONIC DEVICE AND METHOD FOR DRIVING THE SAME

This application claims priority to Korean Patent Application No. 10-2017-0170436, filed on Dec. 12, 2017, and all the benefits accruing therefrom under 35 U.S.C. § 119, the content of which in its entirety is herein incorporated by reference.

BACKGROUND

1. Field

Exemplary embodiments of the invention herein relate to an electronic device and a method for driving the same, and more particularly, to an electronic device bent into a crossed bangle shape and a method for driving the same.

2. Description of the Related Art

Various kinds of electronic devices such as multimedia devices, e.g., a television, a mobile phone, a tablet computer, a navigation unit, and a game console, are being developed. Each of the electronic devices includes a display panel, an input device, and the like. Also, each of the electronic devices that are being developed includes a touch panel as the input device.

In recent years, the electronic devices having various shapes are developed, unlike typical flat electronic devices. An electronic device including a curved display panel, an electronic device including a bendable display panel, an electronic device including a foldable display panel, an electronic device including a rollable display panel, and an electronic device including a stretchable display panel are being developed.

SUMMARY

Exemplary embodiments of the invention provide an electronic device capable of recognizing a crossed bangle shape of an electronic device to provide an image corresponding to a modified shape.

Exemplary embodiments of the invention also provide a method for driving an electronic device capable of providing an image suitable to a modified shape of an electronic device.

An exemplary embodiment of the invention provides an electronic device including a flexible display panel including a display surface having a first length in a first direction and a second length in a second direction crossing the first direction and on which an image is displayed and a rear surface disposed opposite to the display surface in a thickness direction, and having a shape extending in the second direction in a spread state, an input sensing panel including a first portion, a second portion, and a third portion, coupled to the flexible display panel, and having a shape extending in the second direction in a state in which the flexible display panel is spread, and a control module which controls the flexible display panel and the input sensing panel. Here, the first portion is disposed on the display surface, the second portion extends from the first portion and is disposed on the rear surface, the third portion extends from the first portion, is disposed on the rear surface, and is spaced apart from the second portion on the rear surface.

In an exemplary embodiment, the control module may determine that the flexible display panel is in a state bent into a crossed bangle shape, when four input points are sensed from the input sensing panel, a first input point and a second input point of the four input points are sensed in the first portion, and the first input point and the second input point are arranged in a first diagonal direction, a third input point and a fourth input point of the four input points are sensed in the second portion and the third portion, respectively, a first projected point that is obtained by projecting the third input point to the first portion and a second projected point that is obtained by projecting the fourth input point to the first portion are arranged in a second diagonal direction crossing the first diagonal direction.

In an exemplary embodiment, the crossed bangle shape of the flexible display panel may be twisted so that a first end and a second end, which are opposite to each other in the second direction in the spread state, of the flexible display panel contact each other, and two portions of the flexible display panel cross each other to define two rings.

In an exemplary embodiment, when the control module determines the first input point of the first to fourth input points may be closest to the first end of the flexible display panel and the fourth input point of the first to fourth input points may be closest to the second end of the flexible display panel, and the flexible display panel is in a state bent into the crossed bangle shape, the control module displays the image on each of first, second, and third display portions.

Here, the first display portion may be defined from the first end of the flexible display panel to the first input point, the second display portion may be defined from the second end of the flexible display panel to the second projected point, and the third display portion may be defined from the second input point to the first projected point.

In an exemplary embodiment, a distance between an intermediate point of the first and second input points and an intermediate point of the first projected point of the third input point and the second projected point of the fourth input point may correspond to a substantially half of the second length.

In an exemplary embodiment, an average of a distance between the first input point and the second projected point of the fourth input point and a distance between the second input point and the first projected point of the third input point may correspond to a substantially half of the second length.

In an exemplary embodiment, when the control module determines the flexible display panel is in the state bent into the crossed bangle shape, the control module may deactivate the second portion and the third portion of the input sensing panel.

In an exemplary embodiment, the flexible display panel may be worn on a wrist of a user in the state bent into the crossed bangle shape.

In an exemplary embodiment, the electronic device may further include a light shielding pattern overlapping the second portion and the third portion.

In an exemplary embodiment, the second length in the second direction may be about 10 times to about 30 times greater than the first length in the first direction.

In an exemplary embodiment, the second length in the second direction may be about 30 centimeters (cm) to about 50 cm.

In an exemplary embodiment, the electronic device may further include a bending detection sensor which senses variation in shape of the flexible display panel.

In an exemplary embodiment, the bending detection sensor may include a material having a resistance varied in correspondence to intensity of an applied stress.

In an exemplary embodiment of the invention, an electronic device includes a flexible display panel including a display surface having a first length in a first direction and a second length in a second direction crossing the first direction and on which an image is displayed, a rear surface disposed opposite to the display surface in a thickness direction, and side surfaces which connect the display surface to the rear surface, and having a shape extending in the second direction in a spread state, an input sensing panel including a first portion, a second portion, and a third portion, coupled to the flexible display panel, and having a shape extending in the second direction in a state in which the flexible display panel is spread, and a control module which controls the flexible display panel and the input sensing panel. Here, the first portion is disposed on the display surface, the second portion extends from the first portion and is disposed on a first side surface of the side surfaces, the third portion extends from the first portion and is disposed on a second side surface that is disposed opposite to the first side surface of the side surfaces in the first direction.

In an exemplary embodiment, the control module may determine that the flexible display panel is in a state bent into a crossed bangle shape, when four input points are sensed from the input sensing panel, a first input point and a second input point of the four input points are disposed in the second portion and the third portion, respectively, a first projected point that is obtained by projecting the first input point to the first portion and a second projected point that is obtained by projecting the second input point to the first portion are arranged in a first diagonal direction, a third input point and a fourth input point of the four input points are disposed in the third portion and the second portion, respectively, a third projected point that is obtained by projecting the third input point to the first portion and a fourth projected point that is obtained by projecting the fourth input point to the first portion are arranged in a second diagonal direction crossing the first diagonal direction.

In an exemplary embodiment, a distance between an intermediate point of the first and second projected points and an intermediate point of the third and fourth projected points may correspond to a substantially half of the second length.

In an exemplary embodiment, an average of a distance between the first and fourth projected points and a distance between the second and third projected points may correspond to a substantially half of the second length.

In an exemplary embodiment of the invention, a method for driving an electronic device includes determining a crossed bangle operation of the electronic device including a flexible display panel, an input sensing panel, and a control module, and displaying an image on one portion of the flexible display panel, when the electronic device is determined as operating in the crossed bangle shape.

In an exemplary embodiment, the control module may determine that the crossed bangle operation is occurred, when four input points are sensed from the input sensing panel, a first projected point that is obtained by projecting a first input point of the four input points to the flexible display panel and a second projected point that is obtained by projecting a second input point of the four input points to the flexible display panel are arranged in a first diagonal direction, and a third projected point that is obtained by projecting a third input point of the four input points to the flexible display panel and a fourth projected point that is obtained by projecting a fourth input point of the four input points to the flexible display panel are arranged in a second diagonal direction crossing the first diagonal direction.

In an exemplary embodiment, the method may further include sensing a bending operation of the electronic device. When the bending operation of the electronic device is sensed, the crossed bangle operation of the electronic device may be determined.

In an exemplary embodiment, when the first projected point of the first to fourth projected points is closest to the first end of the flexible display panel, and the fourth projected point of the first to fourth projected points is closest to the second end of the flexible display panel, the one portion, on which the image is displayed, of the flexible display panel, may include a first display portion defined from the first end of the flexible display panel to the first projected point, a second display portion defined from the second end of the flexible display panel to the fourth projected point, and a third display portion defined from the second projected point to the third projected point.

In an exemplary embodiment, the determining of the crossed bangle operation of the electronic device may be performed in a repeated manner, and the first, second, and third display portions may be defined on a basis of four input points that are newly sensed from the input sensing panel.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings:

FIG. 7C is a view illustrating a state in which the input points in FIG. 7B are projected to a display surface;

DETAILED DESCRIPTION

Figure 1A:
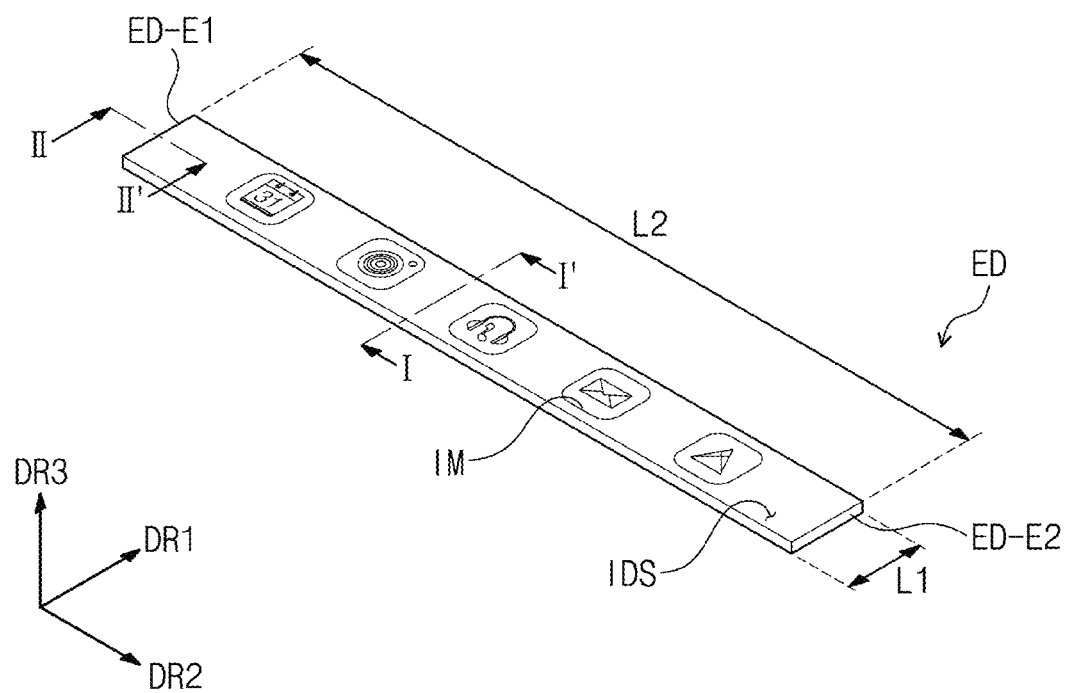
FIG. 1A is a perspective view illustrating an exemplary embodiment of a first operation state of an electronic device according to the invention.

Since the invention may have diverse modified embodiments, specific embodiments are illustrated in the drawings and are described in the detailed description of the invention. However, this does not limit the invention within specific embodiments and it should be understood that the invention covers all the modifications, equivalents, and replacements within the idea and technical scope of the invention.

In the drawings, a portion of the components is exaggerated or minimized in scale to clearly express various layers and areas. Like numbers refer to like elements throughout. Also, it will be understood that when an element or layer is referred to as being formed (disposed) "on" another element or layer, it can be directly formed (disposed) on the other element or layer or intervening elements or layers may be present. Also, although one surface of any layer is flat in the drawings, the one surface doesn't have to be flat, and also, a stepped portion may be generated on a surface of the upper layer according to a shape of a surface of a lower layer in a lamination process.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Some of the parts which are not associated with the description may not be provided in order to specifically describe exemplary embodiments of the invention, and like reference numerals refer to like elements throughout the specification.

Hereinafter, a display apparatus according to an exemplary embodiment of the invention will be described with reference to the drawings.

Figure 1B:
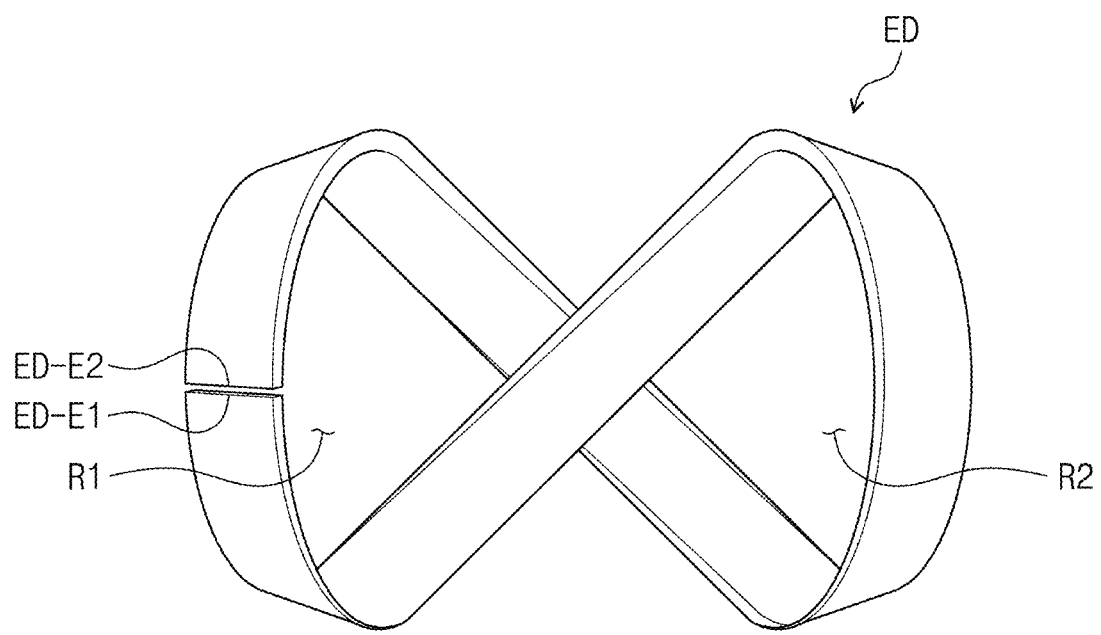
FIG. 1B is a perspective view illustrating an exemplary embodiment of a second operation state of an electronic device according to the invention.
Figure 1C:
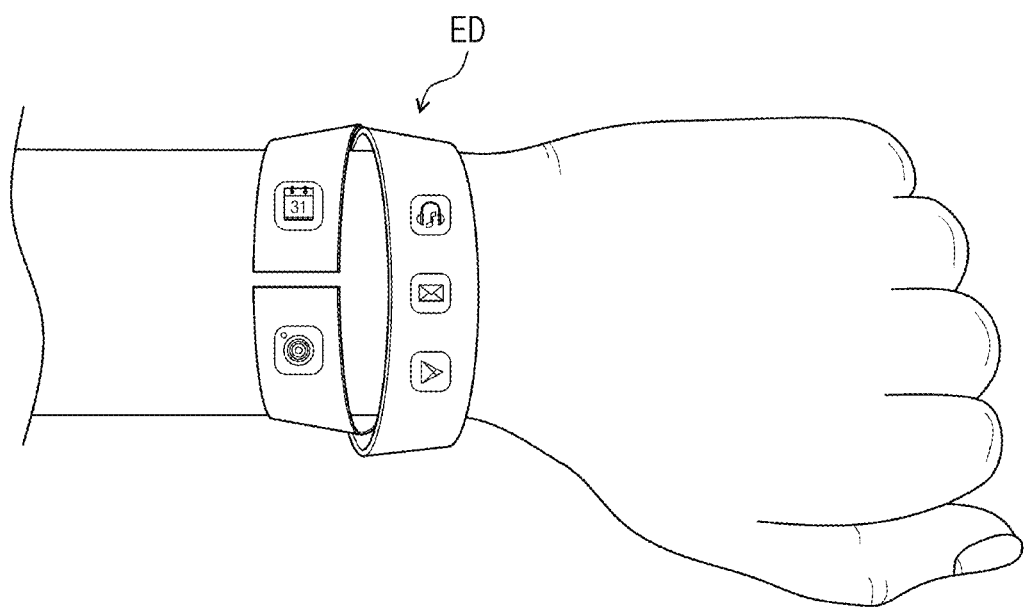
FIG. 1C is a perspective view illustrating a state in which an exemplary embodiment of the electronic device according to the invention is being used.

FIG. 1A is a perspective view illustrating a first operation state of an electronic device ED according to an exemplary embodiment of the invention. FIG. 1B is a perspective view illustrating a second operation state of the electronic device ED according to an exemplary embodiment of the invention. FIG. 1C is a perspective view illustrating a state in which the electronic device ED according to an exemplary embodiment of the invention is being used.

The electronic device ED according to an exemplary embodiment of the invention may operate in a spread state or a state bent into a crossed bangle shape (hereinafter, referred to as a crossed bangle state) according to a usage style of a user. FIG. 1A illustrates a state in which the electronic device ED is spread. FIG. 1B illustrates the crossed bangle state of the electronic device ED. FIG. 1C illustrates a state in which the electronic device ED in the crossed bangle state is worn on a wrist of the user.

The electronic device ED operates as a first mode in a spread state and as a second mode in a crossed bangle state. The electronic device ED has a display surface IDS defined by a first directional axis DR1 and a second directional axis DR2, and an entirety of the display surface IDS is activated when the electronic device ED is in the spread state. The electronic device ED in the first mode may display an image IM by the entirety of the display surface IDS. The electronic device ED in the second mode may activate a portion of the display surface IDS to display the image IM. In the spread state, a normal direction of the display surface IDS indicates a third directional axis DR3. That is, the third directional axis DR3 indicates a thickness direction of the electronic device ED. Front and rear surfaces of each of members are defined by the third directional axis DR3. Hereinafter, the directional axis and the direction indicated by the directional axis are substantially the same as each other.

The display surface IDS has a first length L1 in the first direction DR1 and a second length L2 in the second direction DR2. Hereinafter, the first length L1 may be defined as a width, and the second length L2 in the second direction DR2 may be defined as a length. The electronic device ED in the spread state may have a stick shape extending in the second direction DR2. The display surface IDS may have the substantially same length as that of the electronic device ED and the substantially same width as that of the electronic device ED As illustrated in FIG. 1C, the electronic device ED desirably has a narrow width and a long length so that the electronic device ED is worn on the wrist of the user in the crossed bangle state. In an exemplary embodiment, the electronic device ED may have a length of about 30 centimeters (cm) to about 50 cm, for example. In an exemplary embodiment, the electronic device ED may have a length greater about 10 times to about 30 times of the width thereof, for example.

Here, the "crossed bangle shape" is defined as a shape in which one end ED-E1 and the other end ED-E2, which are opposite to each other in the spread state, of the electronic device ED contact each other, and then the electronic device ED is twisted to define two rings R1 and R2 while two portions of the electronic device ED cross each other.

Figure 2A:
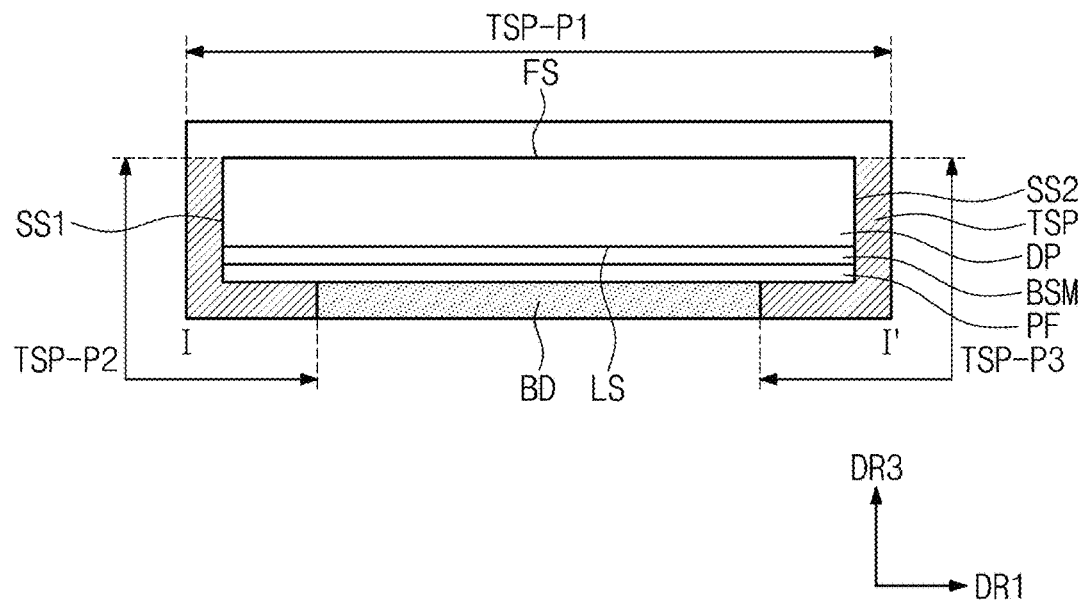
FIGS. 2A and 2B are cross-sectional views of the electronic device in FIG. 1A.
Figure 2B:
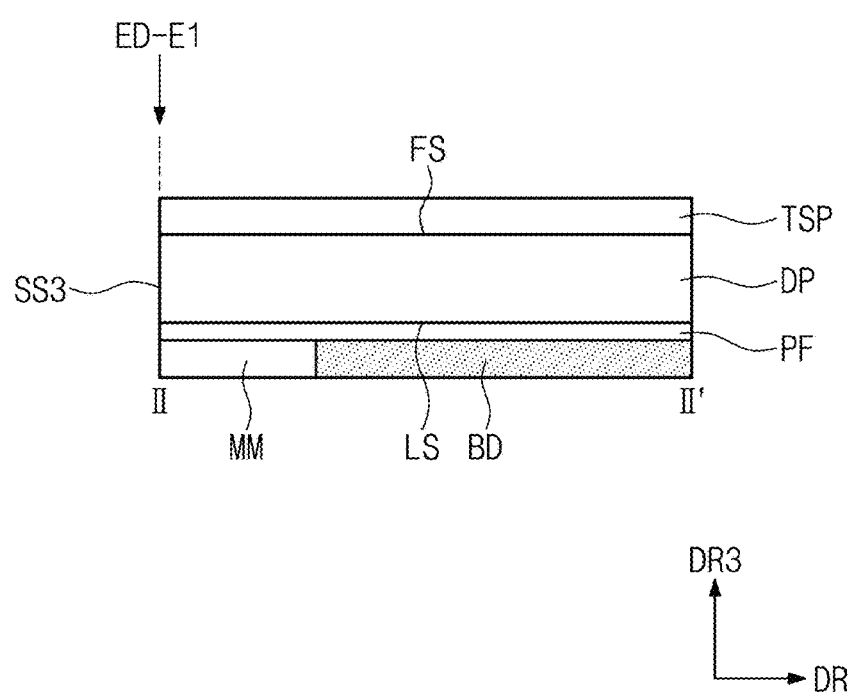
Figure 2C:
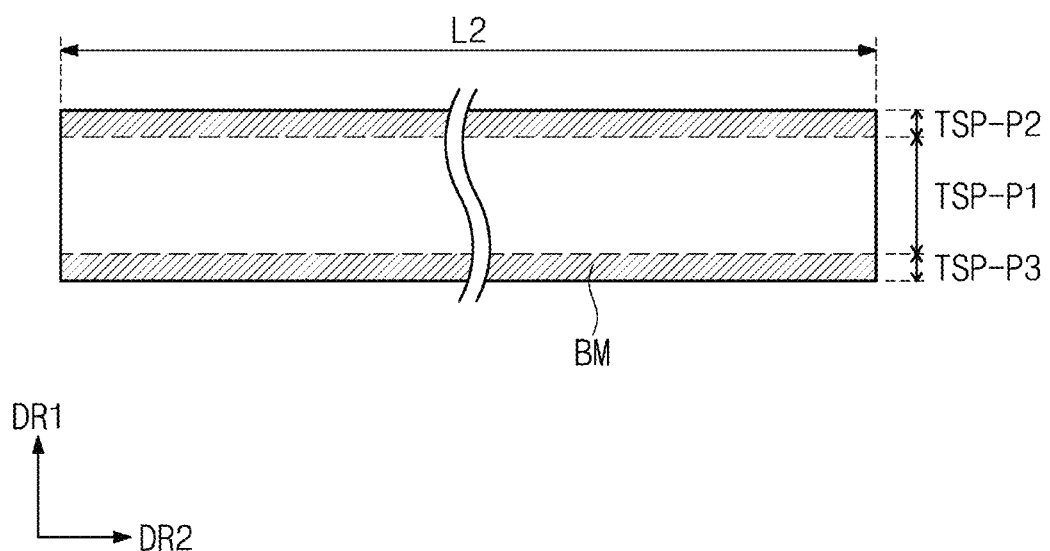
FIG. 2C is a plan view illustrating a state in which an exemplary embodiment of an input sensing panel according to the invention is spread.
Figure 3:
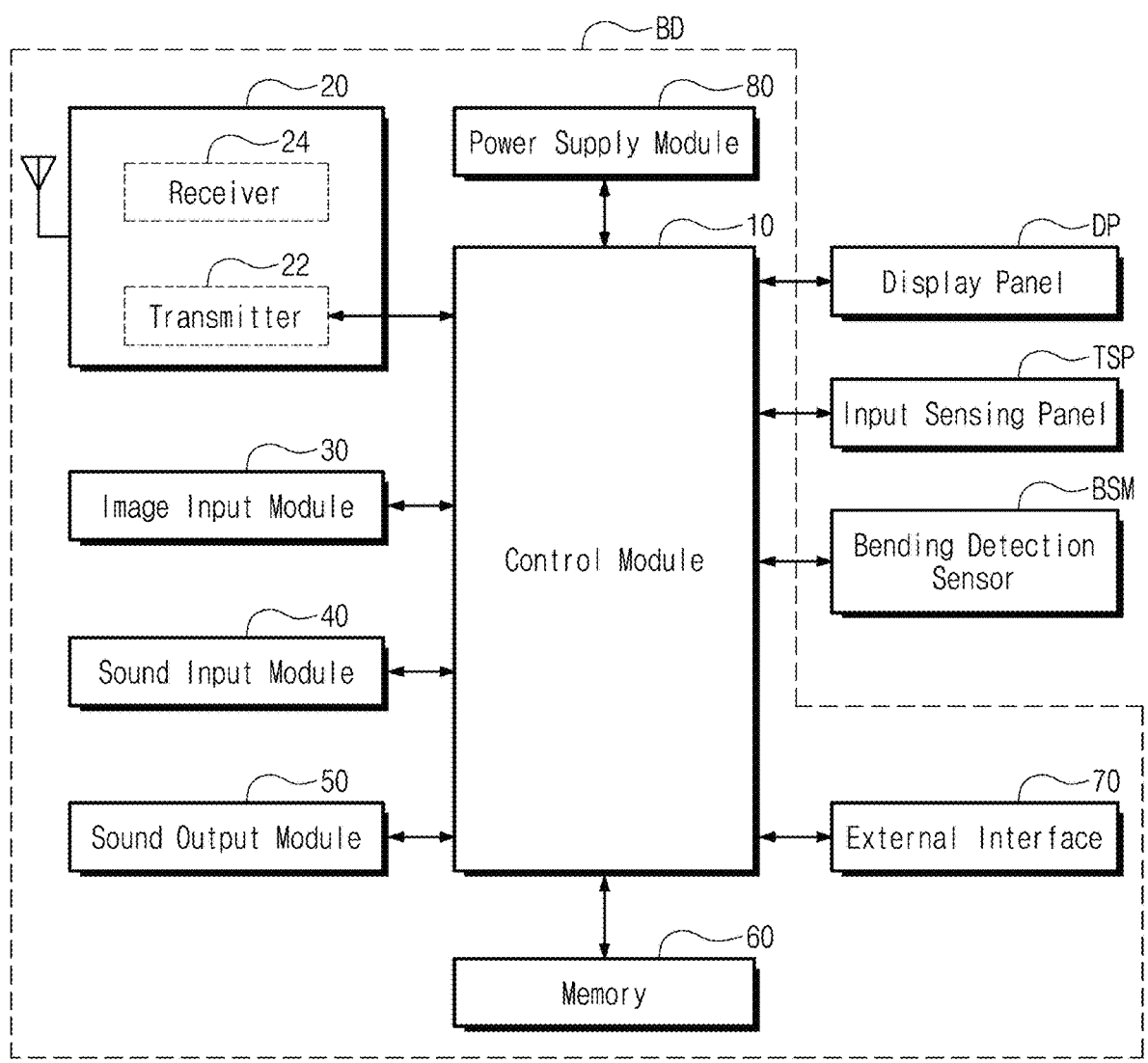
FIG. 3 is a block diagram of an exemplary embodiment of an electronic device according to the invention.

FIGS. 2A and 2B are cross-sectional views illustrating the electronic device ED in FIG. 1A. FIG. 2C is a plane view illustrating a state in which an input sensing panel TSP in FIG. 2A is spread. FIG. 3 is a block diagram illustrating the electronic device ED according to an exemplary embodiment of the invention.

As illustrated in FIGS. 2A and 2B, the electronic device ED according to an exemplary embodiment of the invention includes a flexible display panel DP (hereinafter, referred to as a display panel), an input sensing panel TSP, a bending detection sensor BSM, a coupling member MM, a protective member PF, and a body member BD. The above-described members may be coupled to each other through an adhesive or manufactured to have a module shape (integrated shape) through a continuous process. In another exemplary embodiment of the invention, the coupling member MM, a bending detection sensor, and the protective member PF may be omitted. In another exemplary embodiment, the body member BD may include only a control module for controlling operations of the display panel DP and the input sensing panel TSP.

Although the display panel may be a light emitting-type display panel having a flexible property, the exemplary embodiment of the invention is not limited thereto. In an exemplary embodiment, the display panel DP may be an organic light emitting display panel or a quantum dot light emitting display panel. In an exemplary embodiment, the organic light emitting display panel may include a light emitting layer including an organic light emitting material. In an exemplary embodiment, the quantum dot light emitting display panel may include a light emitting layer including a quantum dot, a quantum rod, and the like.

The display panel DP may include a front surface FS and a rear surface LS disposed opposite to the front surface FS in the third direction DR3. The front surface FS may be substantially the same as the previously-described display surface IDS. The display panel DP is constituted by laminating a plurality of insulation layers, conductive layers, and other functional layers, and side surfaces of the layers define side surfaces SS1, SS2, and SS3 of the display panel DP. A bottom surface of the lowest layer of the above-described layers may define the rear surface LS, and a top surface of the uppermost layer of the layers may define the front surface FS.

The input sensing panel TSP is coupled to the display panel DP to sense an external input. In an exemplary embodiment, the input sensing panel TSP may include a base layer, a sensing electrode, a signal line connected to the sensing electrode, at least one insulation layer, and a protective layer, for example. In an exemplary embodiment, the input sensing panel TSP may sense an external input in a capacitive manner as an example. An exemplary embodiment of the invention is not particularly limited to the operation method of the input sensing panel TSP. In an exemplary embodiment, the input sensing panel TSP according to an exemplary embodiment of the invention may sense an external input in an electromagnetic induction manner or a pressure sensing manner.

As illustrated in FIGS. 2A to 2C, the input sensing panel TSP may have a shape surrounding the display panel DP. The input sensing panel TSP may have the substantially same length as the length L2 of the display panel DP.

The input sensing panel TSP may include a first portion TSP-P1 disposed on the front surface FS of the display panel, a second portion TSP-P2 extending from the first portion TSP-P1 and bent to be disposed on the rear surface LS, and a third portion TSP-P3 extending from the first portion TSP-P1 and bent to be disposed on the rear surface LS. The third portion TSP-P3 may be spaced apart from the second portion TSP-P2 on the rear surface LS. The second portion TSP-P2 and the third portion TSP-P3 may be symmetric with respect to the second directional axis DR2 on the rear surface LS.

The input sensing panel TSP may serve as a window panel. In an exemplary embodiment, the input sensing panel TSP may include a protective layer including a plastic resin, and functional layers such as a hard coating layer, an anti-reflection layer and/or anti-fingerprint layer may be disposed on the protective layer of the input sensing panel TSP. In an exemplary embodiment of the invention, the electronic device ED may further include a window panel that is distinguished from the input sensing panel TSP.

The electronic device ED may further include a light shielding pattern BM overlapping the second portion TSP-P2 and the third portion TSP-P3. In FIG. 2C, an area on which the light shielding pattern BM is disposed is illustrated by dark shading. The light shielding pattern BM blocks light so that inside portions of the input sensing panel TSP and the display panel DP are not seen to the user.

In an exemplary embodiment, the light shielding pattern BM may include a colored organic layer, for example. In an exemplary embodiment, the light shielding pattern BM may be printed on the protective layer of the input sensing panel TSP or on a separated window panel.

The bending detection sensor BSM includes a material having a resistance value varied when a stress is applied thereto. The bending detection sensor BSM may be realized as a strain gauge. In an exemplary embodiment, the bending detection sensor BSM may include a silicon pattern, for example. The silicon pattern has a resistance value varied when the silicon pattern receives a stress caused by a piezoresistance effect. When resistance variation of the silicon pattern is sensed, it may be determined that the electronic device ED is bent.

The bending detection sensor BSM may be disposed on the rear surface LS of the display panel DP. It is unnecessary that the bending detection sensor BSM overlaps an entirety of the display panel DP. The bending detection sensor BSM may be provided in plural.

The protective member PF supports the display panel DP and protects the display panel DP against an external impact. In an exemplary embodiment, the protective member PF may include a plastic film, for example. The protective member PF may include joint structures connected to each other.

As illustrated in FIG. 2B, the coupling member MM is coupled to a bottom surface of the protective member PF. The coupling member MM may be disposed on each of both ends ED-E1 and ED-E2 of the electronic device ED. The two coupling members MM may be coupled to each other to maintain the crossed bangle state of the electronic device ED. In exemplary embodiments, all of the two coupling members MM may be magnets, or the two coupling members MM may include a magnet and metal, respectively, for example.

The body member BD is coupled to the bottom surface of the protective member PF. The body member BD may include a support frame and a plurality of electronic modules coupled to the support frame. The support frame may be a flexible member or include joint structures. A plurality of electronic modules controls an operation of the electronic device. The plurality of electronic modules may be changed according to intended purposes of use of the electronic device.

FIG. 3 is a block diagram exemplarily illustrating electronic modules included in the body member BD when the electronic device is a smart watch. The body member BD may include a control module 10, a wireless communication module 20, an image input module 30, a sound input module 40, a sound output module 50, a memory 60, an external interface 70, a power supply module 80, and the like. The above-described electronic modules may be disposed (e.g., mounted) on a circuit board or electrically connected through a flexible circuit board.

The control module 10 controls an overall operation of the smart watch. In an exemplary embodiment, the control module 10 activates or deactivates the display panel DP, the input sensing panel TSP, and the bending detection sensor BSM. The control module 10 may control an operation of another electronic module included in the body member BD.

As illustrated in FIGS. 1A to 1C, when the operation mode of the electronic device ED is changed from the first mode to the second mode, contents data that is the same as image date of the first mode is converted into image data of the second mode in order to display the same information as the image IM displayed in the first mode on a portion of the display surface IDS. The control module 10 may include a signal processing circuit for data conversion.

The signal processing circuit constitutes a frame by rendering contents data. As illustrated in FIG. 1C, the contents data is rendered by processing a combination of portions of the display surface IDS that is activated in the second mode as the display surface of the second mode. The size of the constituted frame is scaled suitable for the size of the display surface of the second mode. The signal processing circuit provides processed frame data to the display panel DP. The display panel DP converts a received signal into an analog signal, and generates an image on the basis of the converted analog signal.

In an exemplary embodiment, the wireless communication module 20 may transceive a wireless signal with another terminal by Bluetooth (registered trademark) or WiFi (registered trademark) link, for example. The wireless communication module 20 includes a transmitter 22 that modulates a signal to be transmitted and transmits the modulated signal and a receiver 24 that demodulates the received signal.

The image input module 30 processes an image signal to convert the image signal into image data capable of being displayed on the display panel DP. The sound input module 40 receives an external sound signal through a microphone in a recording mode, a voice recognition mode, or the like to convert the received signal into electrical voice data. The sound output module 50 converts the sound data received from the wireless communication module 20 or the sound data stored in a memory 60 to output the converted data to the outside.

The external interface 70 serves as an interface connected to an external charger, a wire/wireless data port, a card socket (e.g., a memory car and a SIM/UIM card), or the like. The power supply module 80 provides a power that is necessary for an overall operation of the smart watch.

Figure 4:
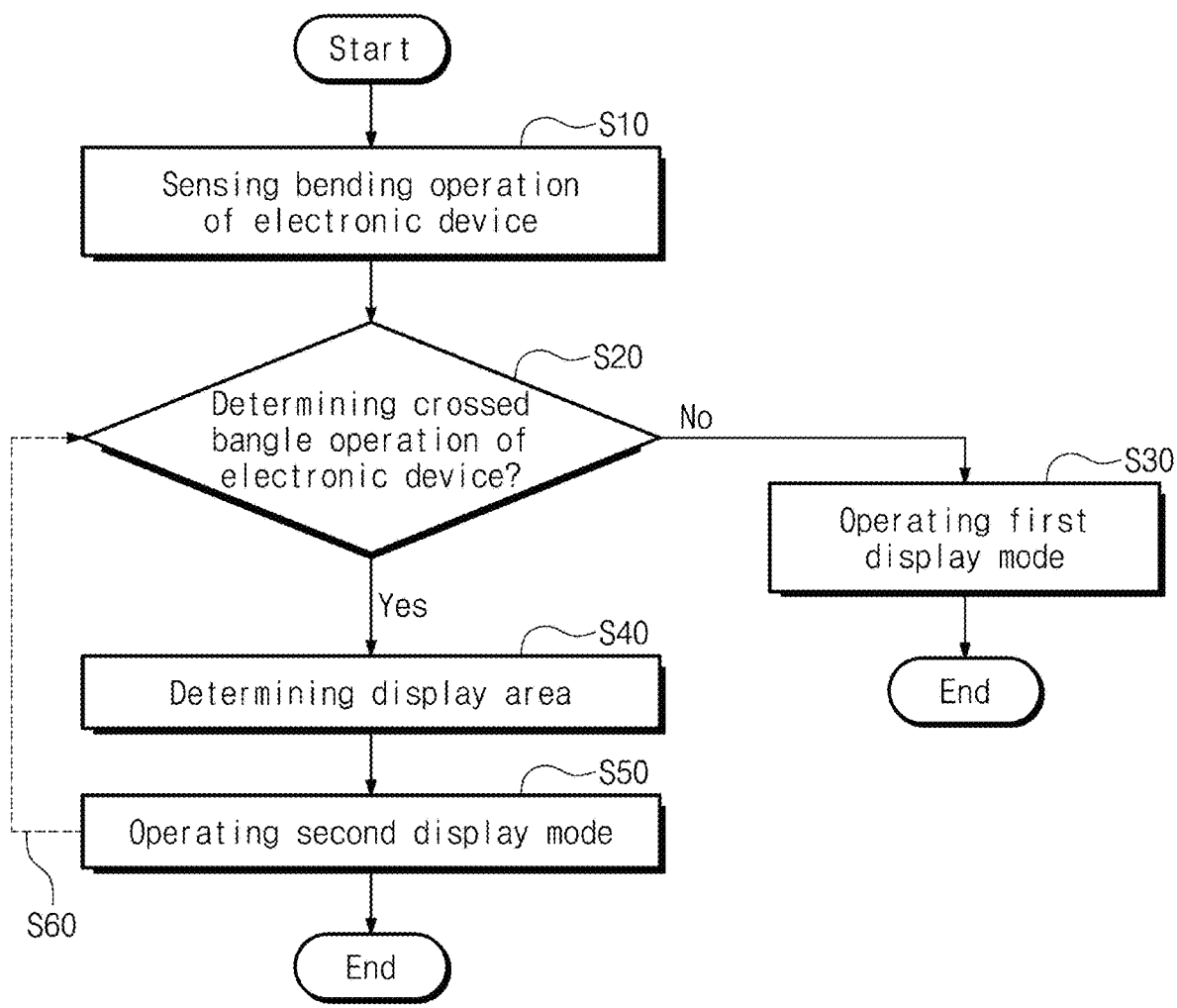
FIG. 4 is a flowchart illustrating an exemplary embodiment of a method for driving an electronic device according to the invention.
Figure 5:
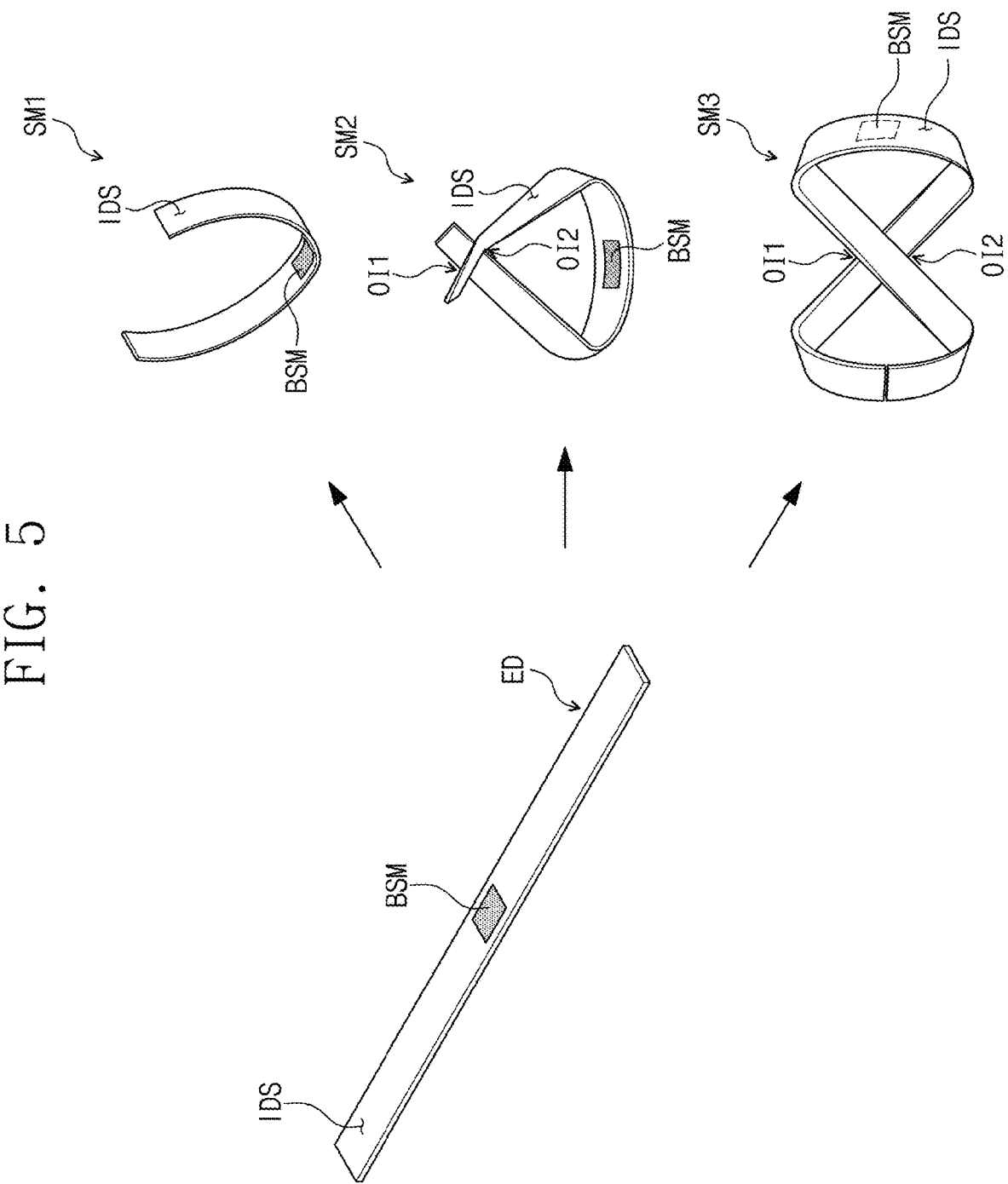
FIG. 5 is a view illustrating an exemplary embodiment of bending operations of an electronic device according to the invention.
Figure 6:
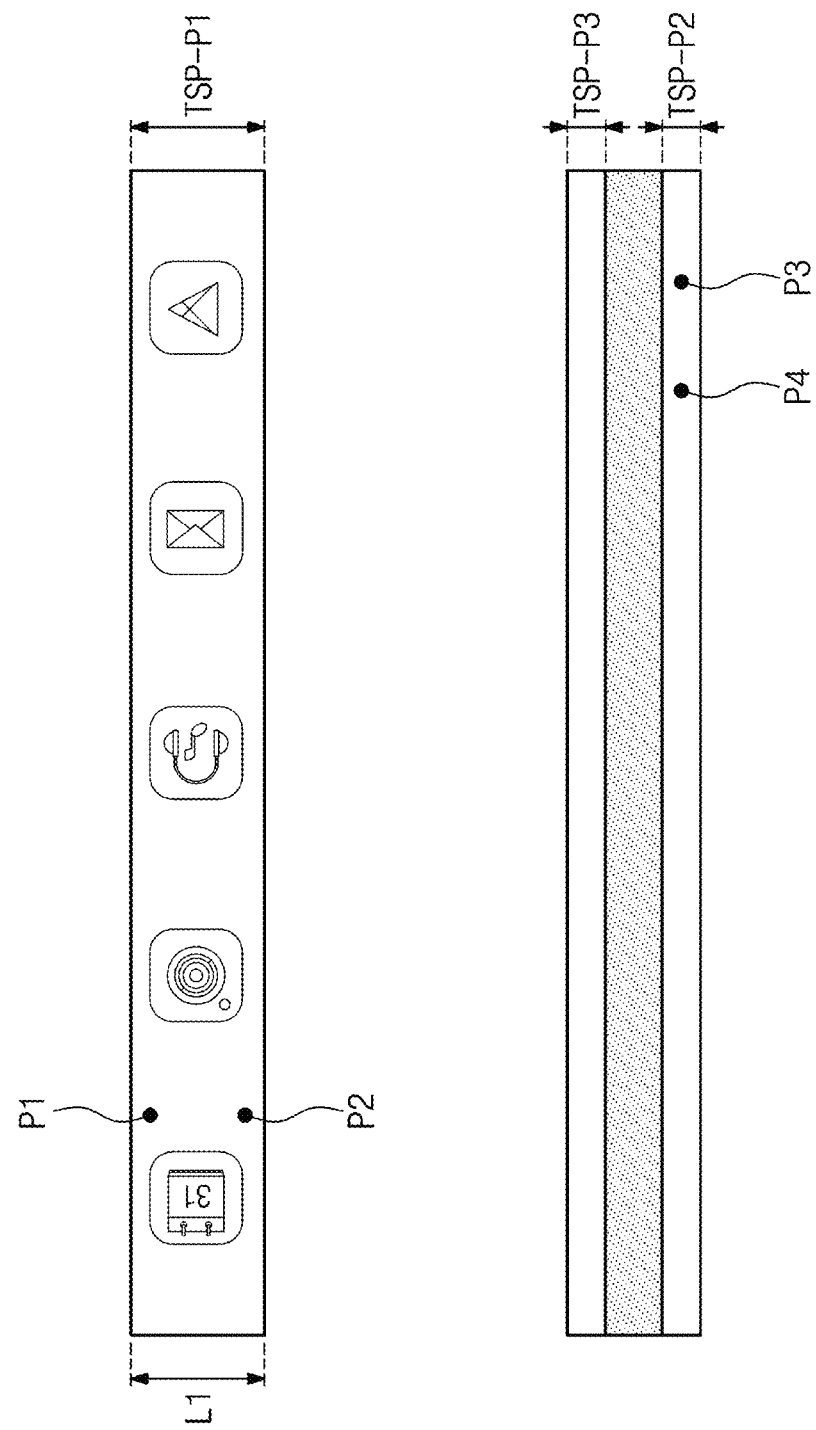
FIG. 6 is a view illustrating input points corresponding to a bending operation according to a comparative example in FIG. 5.
Figure 7A:
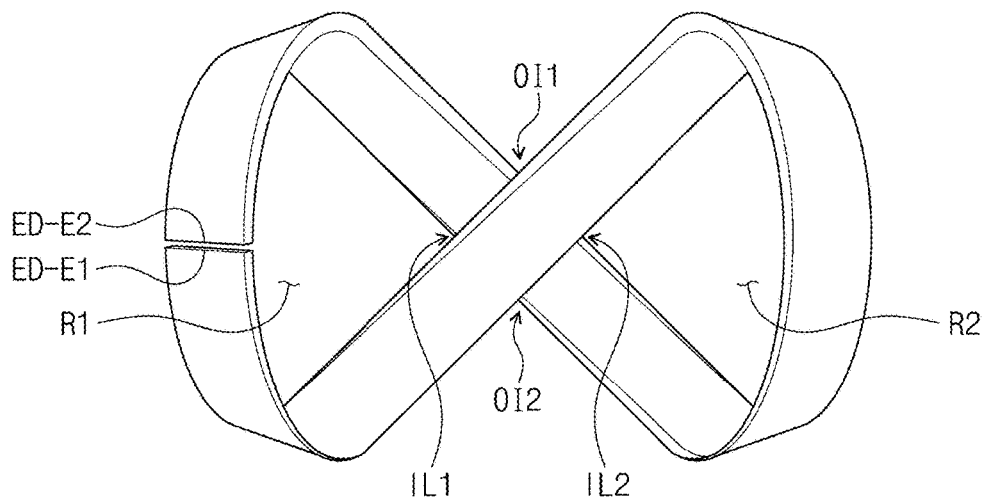
FIG. 7A is a view illustrating an exemplary embodiment of a process in which an external input is generated in a second operation state of an electronic device according to the invention.
Figure 7B:
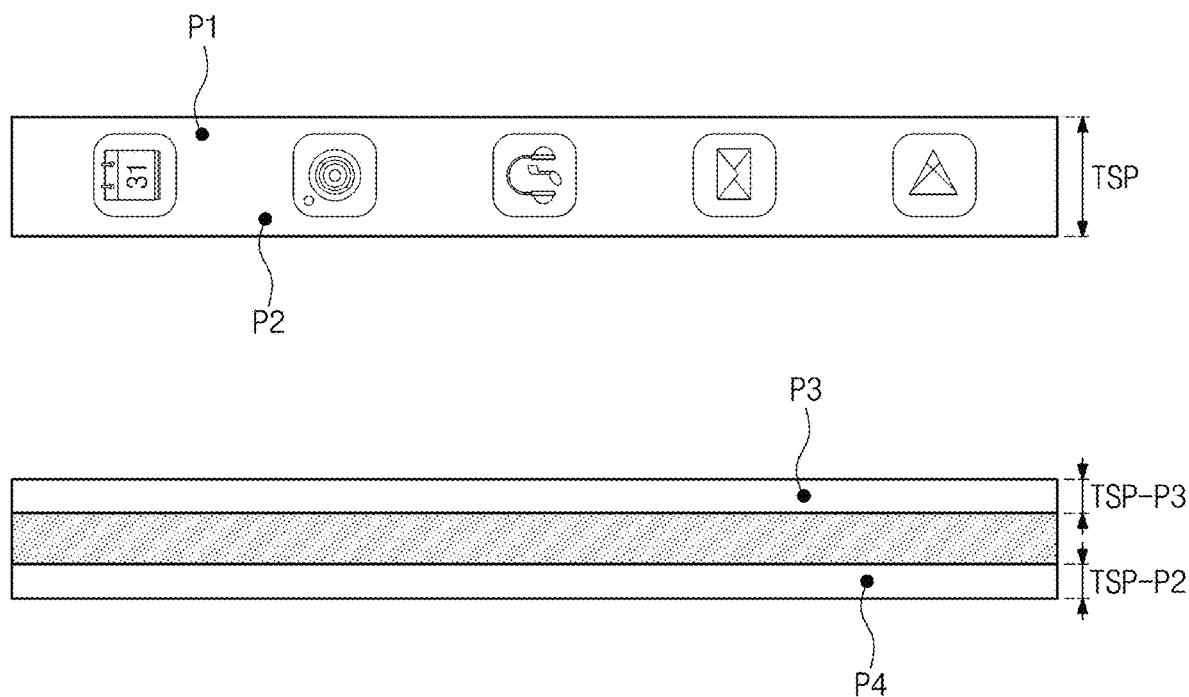
FIG. 7B is a view illustrating input points according to the external input in FIG. 7A.
Figure 7D:
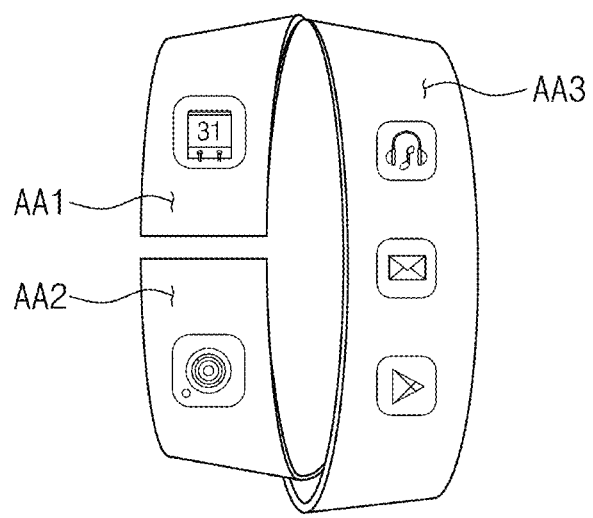
FIG. 7D is a view illustrating an exemplary embodiment of an image displayed in the second operation state of the electronic device according to the invention.

FIG. 4 is a flowchart illustrating a method for driving the electronic device ED according to an exemplary embodiment of the invention. FIG. 5 is a view illustrating bending operations of the electronic device ED according to an exemplary embodiment of the invention. FIG. 6 is a view illustrating input points P1 to P4 corresponding to a bending operation according to a comparative example in FIG. 5. FIG. 7A is a view illustrating a process in which an external input is generated in a second operation state of the electronic device ED according to an exemplary embodiment of the invention. FIG. 7B is a view illustrating the input points P1 to P4 according to the external input in FIG. 7A. FIG. 7C is a view illustrating a state in which the input points P1 to P4 in FIG. 7B is projected on the display surface IDS. FIG. 7D is a view illustrating the image IM displayed in a second operation state of the electronic device ED according to an exemplary embodiment of the invention.

As illustrated in FIG. 4, in operation S10, a bending operation of the electronic device ED is sensed. The electronic device ED may sense the bending operation of the electronic device ED in a state of operating in a first mode or a deactivated state.

In FIG. 5, three kinds of bending operations are exemplarily illustrated. When the electronic device ED is bent, a stress is applied to the bending detection sensor BSM, and resistance of the bending detection sensor BSM is varied. The control module 10 (refer to FIG. 3) may determine that the electronic device ED is bent, when the bending detection sensor BSM senses resistance value variation that is equal to or greater than a reference value. The control module may determine that the bending state is maintained, while the resistance value variation that is equal to or greater than the reference value is maintained. Although the bending detection sensor BSM is not used, when the input points sensed from the input sensing panel TSP satisfies a predetermined condition, which will be described later, it is determined that the electronic device ED is bent.

As illustrated in FIG. 4, in operation S20, it is determined whether the bending operation of the electronic device ED is crossed bangle operation. The control module 10 determines whether the input points sensed from the input sensing panel TSP satisfy a predetermined condition.

Like a first operation SM1 in FIG. 5, when the input points are not sensed, it is determined that the operation is not the crossed bangle operation. Here, an external input caused by a gripping of a user is excluded.

Like a second operation SM2 in FIG. 5, the electronic device ED may be bent so that two portions of the electronic device ED contact each other. It may be determined that two external inputs OI1 and OI2 are generated when the two portions contact each other. As illustrated in FIG. 6, four input points P1 to P4 may be sensed by the two external inputs OI1 and OI2. The first point P1 and the third point P3 may be determined by the first external input OI1 in FIG. 5, and the second point P2 and the fourth point P4 may be determined by the second external input OI2 in FIG. 5. It is sensed that the first point P1 and the second point P2 are adjacent to each other, and the third point P3 and the fourth point P4 are adjacent to each other. The first point P1 and the second point P2 may be sensed in a first portion TSP-P1, and the third point P3 and the fourth point P4 may be sensed in a second portion TSP-P2. In an alternative exemplary embodiment, the third point P3 and the fourth point P4 may be sensed in a third portion TSP-P3 according to a shape of a crossed bending operation.

When a distance between the first and second points P1 and P2, which are sensed in the first portion TSP-P1, and a distance between the third and fourth points P3 and P4, which are sensed in the second portion TSP-P2, are within a reference range, the operation may be determined as the crossed bending operation like the second operation SM2 in FIG. 5. In an exemplary embodiment, the reference range may be set on the basis of the width L1 of the display surface IDS, and may be equal to or greater than the width L1 and equal to or less than three times the width L1, for example.

When the four input points P1 to P4 that satisfy the above condition are sensed, the control module 10 determines that the bending operation is performed. However, since it is not determined to be bent into the crossed bangle shape, in operation S30, the control module 10 operates in the first mode as in FIG. 4. Here, the operation of the first mode may represent maintaining of the first mode or variation from the deactivate state to the activate state.

Like a third operation SM3 in FIG. 5, the electronic device ED may be bent into the crossed bangle shape. When bent into the crossed bangle shape, the two portions of the electronic device ED contact each other, and two external inputs OI1 and OI2 are generated when the two portions contact each other. Since the crossed bangle shape operates and maintains in a direction in which a portion defining a first ring R1 and a portion defining a second ring R2 approach each other, two points IL1 and IL2 indicated in FIG. 7A contact later than the two external inputs OI1 and OI2 or do not contact each other.

As illustrated in FIG. 7B, four input points P1 to P4 may be sensed by the two external inputs OI1 and OI2. The first point P1 and the third point P3 may be determined by the first external input OI1 in FIG. 7A, and the second point P2 and the fourth point P4 may be determined by the second external input OI2 in FIG. 7A. It is sensed that the first point P1 and the second point P2 are adjacent to each other, and the third point P3 and the fourth point P4 are adjacent to each other. The first point P1 and the second point P2 may be sensed in a first portion TSP-P1, and the third point P3 and the fourth point P4 may be sensed in a third portion TSP-P3 and a second portion TSP-P2, respectively.

Referring to FIG. 7C, the third point P3 and the fourth point P4 are defined as projected points of the third and fourth points P3 and P4 with respect to the display surface IDS. Projected points of the first and second points P1 and P2 are the same as those before projected.

As illustrated in FIG. 7C, the first point P1 and the second point P2 are arranged in a first diagonal direction DR4. The third point P3 and the fourth point P4 may be arranged in a second diagonal direction DR5 crossing the first diagonal direction DR4. When the four input points P1 to P4 that satisfy the above condition are sensed, the control module 10 determines that the bending operation is performed.

A condition for improving reliability of the operation S20 that determines whether a bending operation is crossed bangle operation may be added. A distance between an intermediate point PC12 (hereinafter, referred to as a first intermediate point) of the first and second points P1 and P2 and an intermediate point PC34 (hereinafter, referred to as a second intermediate point) of the third and fourth points P3 and P4 may be compared with the length of the electronic device ED. When the distance between first intermediate point PC12 and the second intermediate point PC34 substantially further satisfies a length L2/2 corresponding to a half of the length L2 (refer to FIG. 1A) of the electronic device ED, the control module 10 determines that the crossed bangle operation is performed. Here, a case within an error range of −10% to +10% is included in addition to the case in which the distance between the first intermediate point PC12 and the second intermediate point PC34 is the same as the length L2/2.

The above-described additional condition may be replaced by a condition that will be described later. An average of a distance between the first and fourth input points P1 and P4 and a distance between the second and third input points P2 and P3 may substantially correspond to the length L2/2 corresponding to a half of the length L2 (refer to FIG. 1A) of the electronic device ED. Substantially, the half length includes the case within an error range of −10% to +10%.

When the electronic device ED is determined as being bent into the crossed bangle shape, in operation S40, the control module 10 determines a display area of the second mode, which will be activated in the display surface IDS. The control module 10 may determine the display area by the four input points P1 to P4 in FIG. 7C. A first display area AA1 (or a first display portion) may be determined from the other end ED-E2 of the electronic device ED to the fourth point P4, and a second display area AA2 (or a second display portion) may be determined from one end ED-E1 of the electronic device ED to the first point P1. A third display area AA3 (or a third display portion) may be determined from the second point P2 to the third point P3. Here, the fourth point P4 is a point closest to the other end ED-E2 of the electronic device ED among the four input points P1 to P4, and the first point P1 is a point closest to the one end ED-E1 of the electronic device ED among the four input points P1 to P4.

A boundary of the first display area AA1, which is defined by the fourth point P4, and a boundary of the second display area AA2, which is defined by the first point P1, may be determined in various methods. In an exemplary embodiment, the first display area AA1 may be determined from the boundary line overlapping the fourth point P4 and extending in the first direction DR1 to the other end ED-E2 of the electronic device ED, and the second display area AA2 may be determined from the boundary line overlapping the first point P1 and extending in the first direction DR1 to the one end ED-E1 of the electronic device ED. The third display area AA3 may be determined from the boundary line overlapping the third point P3 and extending in the first direction DR1 to the boundary line overlapping the second point P2 and extending in the first direction DR1.

An area from the first point P1 to the second point P2 and an area from the third point P3 to the fourth point P4 may be deactivated or may display only background image excluding contents. A non-active area may be determined by the boundary lines overlapping the first point P1, the second point P2, the third point P3, and the fourth point P4.

When the display area of the second mode is determined, in operation S50, the second mode operates. The control module 10 may activate only first to third display areas AA1, AA2, and AA3. The control module 10 approximately renders contents data of the first mode on the first to third display areas AA1, AA2, and AA3 to constitute a frame. Also, the frame may have a size that is scaled suitable for that of the display surface defining the first to third display areas AA1, AA2, and AA3. Icon images in FIG. 7D are obtained by rendering and scaling the icon images IM (refer to FIG. 1A) to be matched in the second mode In an exemplary embodiment of the invention, in operation S60, a process of determining the crossed bangle operation may be performed in a repeated manner. The control module 10 may newly define the first to third display areas on the basis of four input points that are newly sensed from the input sensing panel TSP.

In an exemplary embodiment of the invention, the control module 10 may deactivate the second portion TSP-P2 (refer to FIG. 2C) and the third portion TSP-P3 (refer to FIG. 2C). The reason is that, when electronic device is worn on the wrist of the user as in FIG. 1C, malfunction may be generated because a skin of the wrist is recognized as an external input applied to the second portion TSP-P2 and the third portion TSP-P3.

Figure 8A:
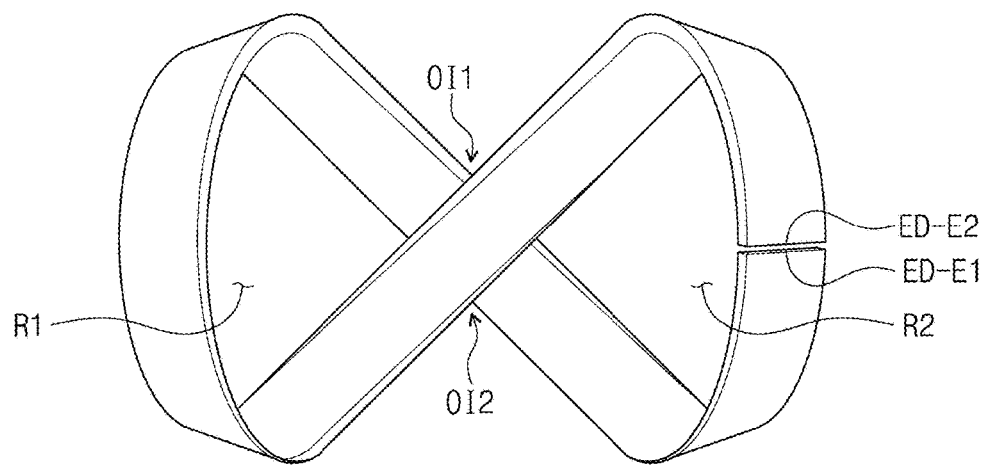
FIG. 8A is a view illustrating an exemplary embodiment of a process in which an external input is generated in a second operation state of an electronic device according to the invention.
Figure 8B:
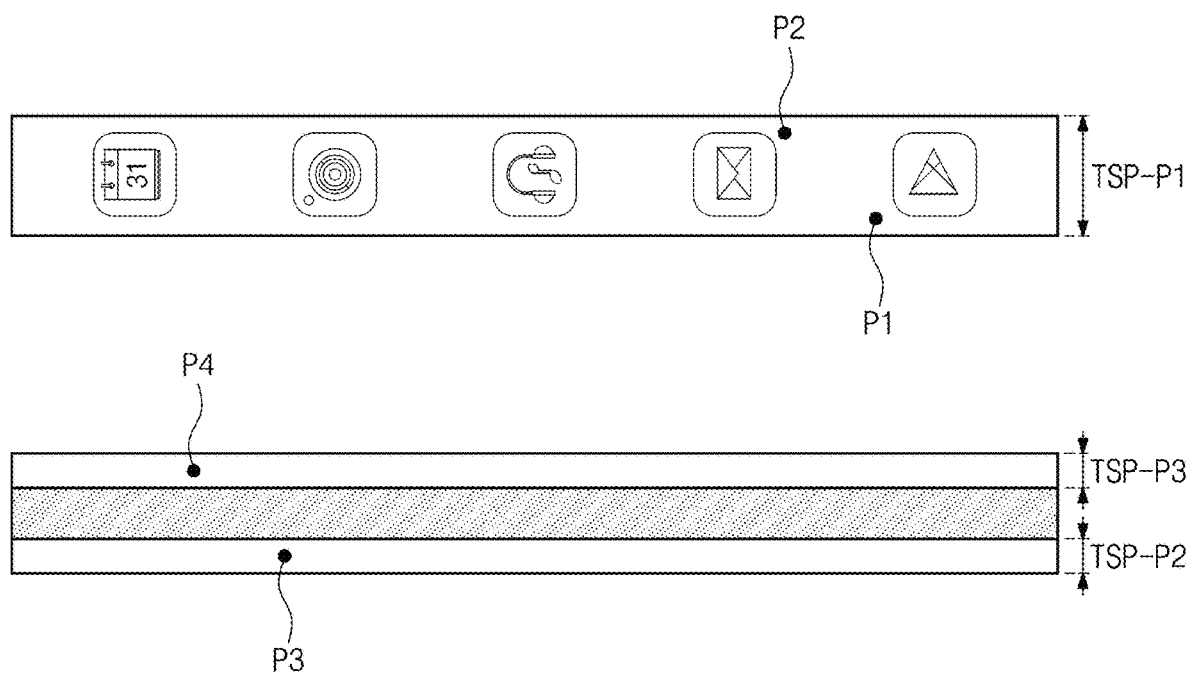
FIG. 8B is a view illustrating input points according to the external input in FIG. 8A.
Figure 8C:
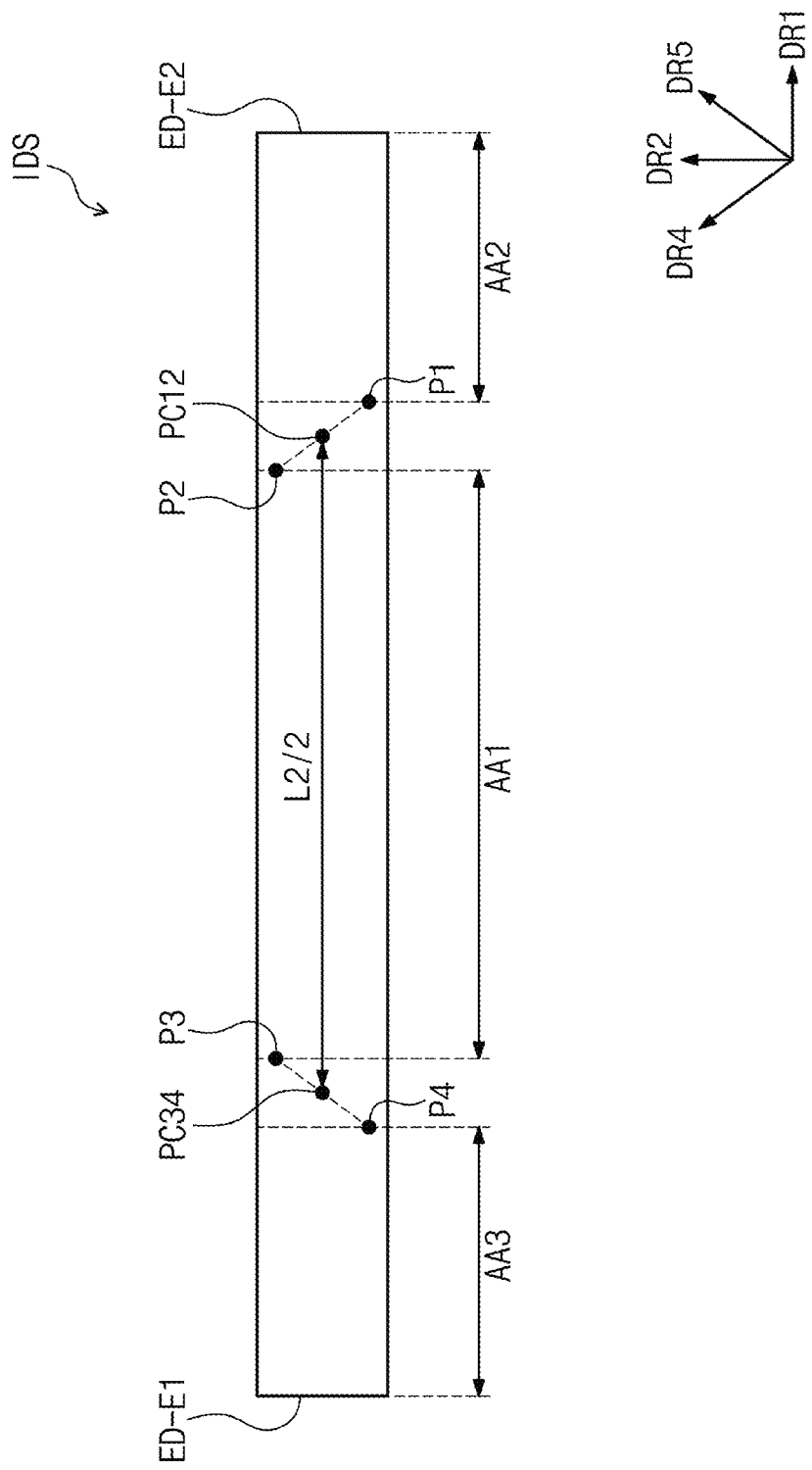
FIG. 8C is a view illustrating a state in which the input points in FIG. 8B are projected to a display surface.
Figure 8D:
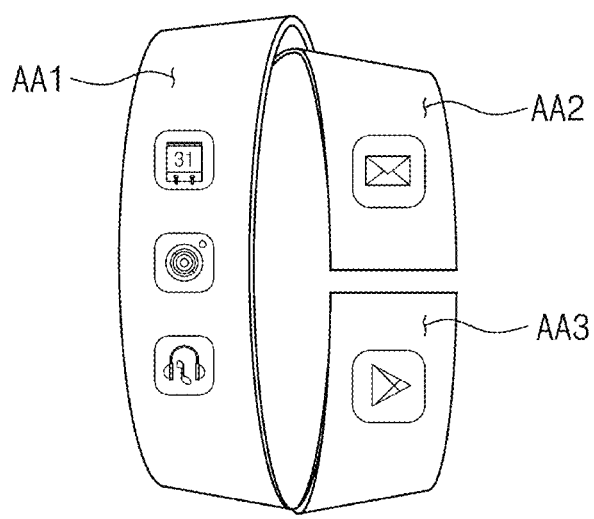
FIG. 8D is a view illustrating an exemplary embodiment of an image displayed in the second operation state of the electronic device according to the invention.

FIG. 8A is a view illustrating a process in which an external input is generated in a second operation state of the electronic device ED according to an exemplary embodiment of the invention. FIG. 8B is a view illustrating the input points P1 to P4 according to the external input in FIG. 8A. FIG. 8C is a view illustrating a state in which the input points P1 to P4 in FIG. 8B are projected on the display surface IDS. FIG. 8D is a view illustrating an image displayed in a second operation state of the electronic device ED according to an exemplary embodiment of the invention. Hereinafter, detailed description regarding the same components described with reference to FIGS. 4 to 7D will be omitted.

The second operation state of the electronic device ED in FIG. 8A is substantially the same as that of the electronic device ED in FIG. 7A except for a twisted direction. FIG. 8B is a view illustrating the four input points P1 to P4 sensed by the two external inputs OI1 and OI2 in FIG. 8A.

The four input points P1 to P4 in FIG. 8C is substantially the same as those in FIG. 7C except for the positions thereof in terms of the operation S20 of determining whether the bending operation is crossed bangle operation by the four input points P1 to P4, the operation S40 of determining the display area of the second mode, and the operation S50 of displaying the image of the second mode.

As illustrated in FIG. 8C, a first display area AA1 may be determined from the second point P2 to the third point P3, a second display area AA2 may be determined from the other end ED-E2 of the electronic device ED to the first point P1, and a third display area AA3 may be determined from the one end ED-E1 of the electronic device ED to the fourth point P4.

FIG. 8D is a view illustrating the image displayed in the second mode. In the exemplary embodiment, the first to third display areas AA1, AA2, and AA3 are determined different from those in FIG. 7C, rendering and scaling may be performed in a manner different from the data processing performed in FIG. 7D.

Figure 9A:
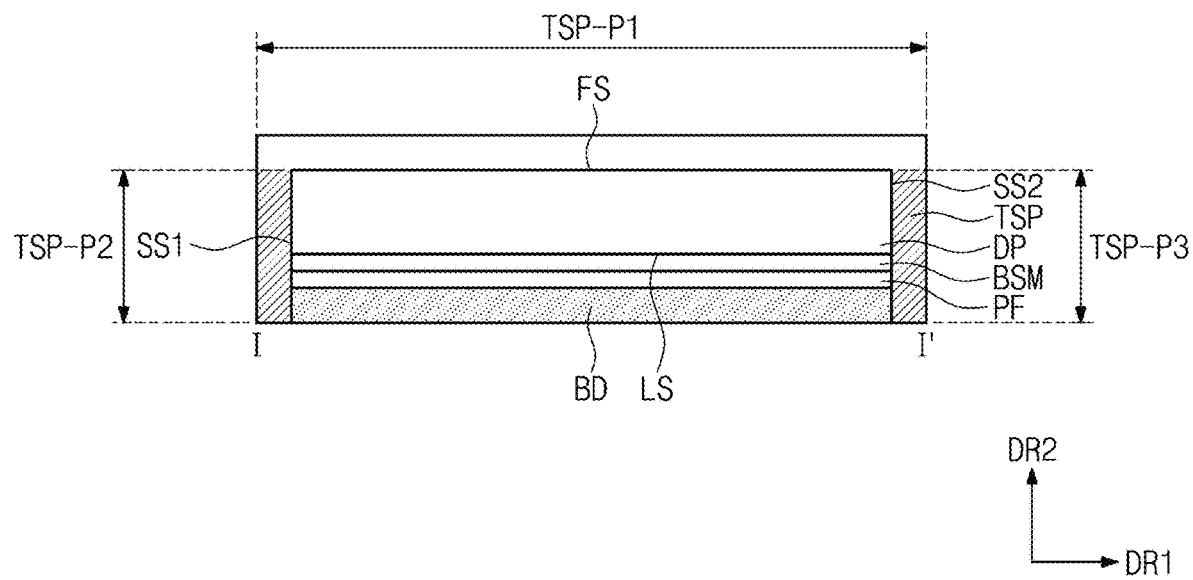
FIG. 9A is a cross-sectional view illustrating an exemplary embodiment of an electronic device according to the invention.
Figure 9B:
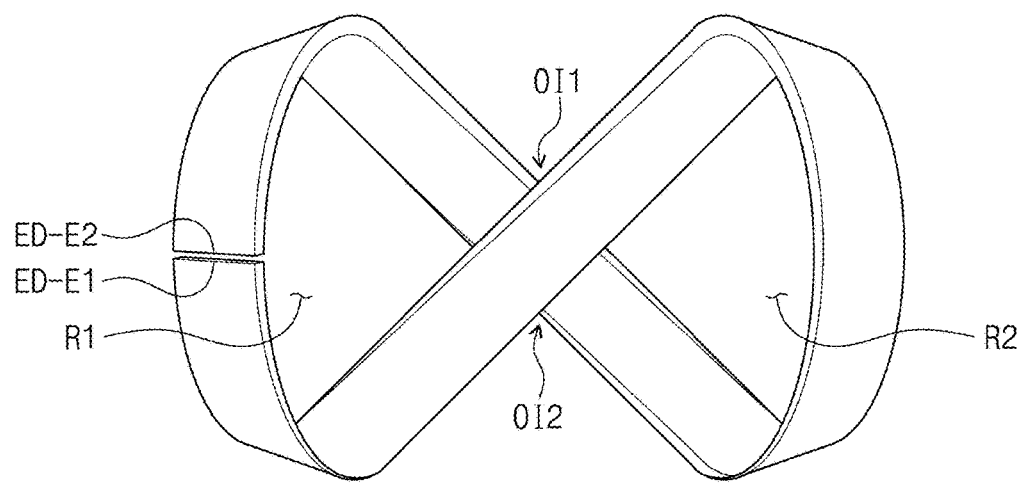
FIG. 9B is a view illustrating an exemplary embodiment of a process in which an external input is generated in a second operation state of an electronic device according to the invention.
Figure 9C:
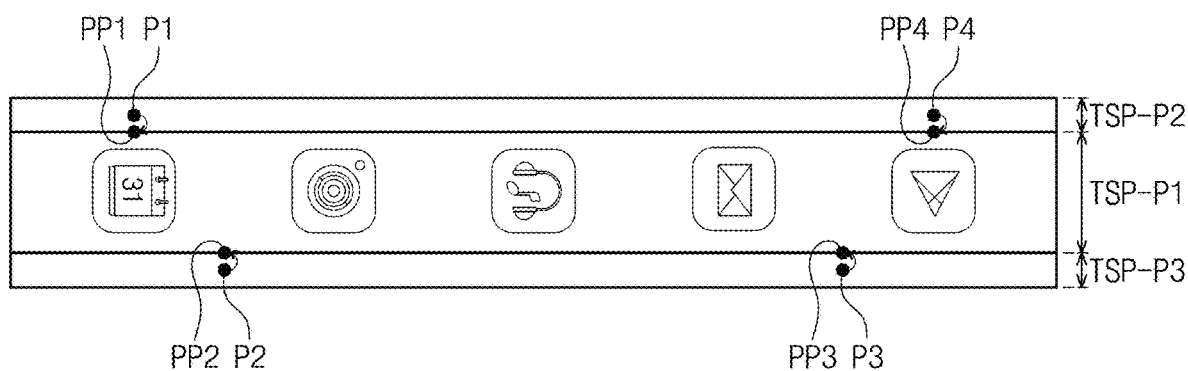
FIG. 9C is a view illustrating input points according to the external input in FIG. 9B.

FIG. 9A is a cross-sectional view of the electronic device ED according to an exemplary embodiment of the invention. FIG. 9B is a view illustrating a process in which an external input is generated in the second operation state of the electronic device ED according to an exemplary embodiment of the invention. FIG. 9C is a view illustrating input points P1 to P4 according to the external input in FIG. 9B. Hereinafter, detailed description regarding the same components described with reference to FIGS. 1 to 8D will be omitted.

According to the exemplary embodiment, an input sensing panel TSP may be different in shape from the input sensing panel TSP described with reference to FIGS. 1 to 8D. As illustrated in FIG. 9A, a second portion may extend from a first portion TSP-P1 and face a first side surface SS1, and a third portion TSP-P3 may extend from the first portion TSP-P1 and face a second side surface SS2. The second portion TSP-P2 and the third portion TSP-P3 do not face a rear surface LS.

The third portion TSP-P3 may be spaced apart from the second portion TSP-P2 on the rear surface LS. The second portion TSP-P2 and the third portion TSP-P3 may be symmetric with respect to the second directional axis DR2 on the rear surface LS.

External inputs OI1 and OI2 in FIG. 9B may be generated on the second portion TSP-P2 and the third portion TSP-P3. First to fourth points P1 to P4 sensed from the input sensing panel TSP may be projected to the first portion TSP-P1. First to fourth points PP1 to PP4 that are obtained by projecting the first to fourth points P1 to P4 through a shortest distance may be calculated. The operation S20 of determining whether crossed bangle operation is performed by assuming the projected first to fourth points PP1 to PP4 as the first to fourth points P1 to P4 in FIG. 7C, the operation S40 of determining the display area of the second mode, and the operation S50 of displaying the image of the second mode may be performed.

Although not separately shown, when side touch is generated on the input sensing panel TSP in FIGS. 2A to 2C, the operations S20, S40, and S50 may be performed in the same manner as the exemplary embodiment.

As described above, the shape of the electronic device bent into the crossed bangle shape may be recognized by information of the plurality of input points sensed from the input sensing panel. The image suitable for the deformed shape of the electronic device may be provided.

Although the exemplary embodiments of the invention have been described, it is understood that the invention should not be limited to these exemplary embodiments but various changes and modifications may be made by one ordinary skilled in the art within the spirit and scope of the invention as hereinafter claimed.

Hence, the real protective scope of the invention shall be determined by the technical scope of the accompanying claims.

What is claimed is:

1. An electronic device comprising:
a flexible display panel comprising a display surface having a first length in a first direction and a second length in a second direction crossing the first direction and on which an image is displayed and a rear surface disposed opposite to the display surface in a thickness direction, and having a shape extending in the second direction in a spread state;
an input sensing panel comprising a first portion, a second portion, and a third portion, coupled to the flexible display panel, and having a shape extending in the second direction in a state in which the flexible display panel is spread,
wherein
the first portion is disposed on the display surface, the second portion extends from the first portion and is disposed on the rear surface, the third portion extends from the first portion, is disposed on the rear surface, and is spaced apart from the second portion on the rear surface;
a control module which controls the flexible display panel and the input sensing panel,
the control module determines that the flexible display panel is in a state bent into a crossed bangle shape, when four input points are sensed from the input sensing panel, a first input point and a second input point of the four input points are sensed in the first portion, and the first input point and the second input point are arranged in a first diagonal direction, a third input point and a fourth input point of the four input points are sensed in the second portion and the third portion, respectively, a first projected point which is obtained by projecting the third input point to the first portion and a second projected point which is obtained by projecting the fourth input point to the first portion are arranged in a second diagonal direction crossing the first diagonal direction, and
the crossed bangle shape of the flexible display panel is twisted so that a first end and a second end, which are opposite to each other in the second direction in the spread state, of the flexible display panel contact each other, and two portions of the flexible display panel cross each other to define two rings.

2. The electronic device of claim 1, wherein when the control module determines the first input point of the first to fourth input points is closest to the first end of the flexible display panel, the fourth input point of the first to fourth input points is closest to the second end of the flexible display panel, and the flexible display panel is in a state bent into the crossed bangle shape, the control module displays the image on each of first, second, and third display portions, and
wherein the first display portion is defined from the first end of the flexible display panel to the first input point, the second display portion is defined from the second end of the flexible display panel to the second projected point, and the third display portion is defined from the second input point to the first projected point.

3. The electronic device of claim 1, wherein a distance between an intermediate point of the first and second input points and an intermediate point of the first projected point of the third input point and the second projected point of the fourth input point corresponds to a substantially half of the second length.

4. The electronic device of claim 1, wherein an average of a distance between the first input point and the second projected point of the fourth input point and a distance between the second input point and the first projected point of the third input point corresponds to a substantially half of the second length.

5. The electronic device of claim 1, wherein, when the control module determines the flexible display panel is in the state bent into the crossed bangle shape, the control module deactivates the second portion and the third portion of the input sensing panel.

6. The electronic device of claim 1, wherein the flexible display panel is worn on a wrist of a user in the state bent into the crossed bangle shape.

7. The electronic device of claim 1, further comprising a light shielding pattern overlapping the second portion and the third portion.

8. The electronic device of claim 1, wherein the second length in the second direction is about 10 times to about 30 times greater than the first length in the first direction.

9. The electronic device of claim 1, wherein the second length in the second direction is about 30 centimeters to about 50 centimeters.

10. The electronic device of claim 1, further comprising a bending detection sensor which senses variation in shape of the flexible display panel.

11. The electronic device of claim 10, wherein the bending detection sensor contains a material having a resistance varied in correspondence to intensity of an applied stress.

12. An electronic device comprising:
a flexible display panel comprising a display surface having a first length in a first direction and a second length in a second direction crossing the first direction and on which an image is displayed, a rear surface disposed opposite to the display surface in a thickness direction, and side surfaces which connect the display surface to the rear surface, and having a shape extending in the second direction in a spread state;
an input sensing panel comprising a first portion, a second portion, and a third portion, coupled to the flexible display panel, and having a shape extending in the second direction in a state in which the flexible display panel is spread, wherein the first portion is disposed on the display surface, the second portion extends from the first portion and is disposed on a first side surface of the side surfaces, the third portion extends from the first portion and is disposed on a second side surface which is disposed opposite to the first side surface of the side surfaces in the first direction; and
a control module which controls the flexible display panel and the input sensing panel,
wherein the control module determines that the flexible display panel is in a state bent into a crossed bangle shape, when four input points are sensed from the input sensing panel, a first input point and a second input point of the four input points are disposed in the second portion and the third portion, respectively, a first projected point which is obtained by projecting the first input point to the first portion and a second projected point which is obtained by projecting the second input point to the first portion are arranged in a first diagonal direction, a third input point and a fourth input point of the four input points are disposed in the third portion and the second portion, respectively, a third projected point which is obtained by projecting the third input point to the first portion and a fourth projected point which is obtained by projecting the fourth input point to the first portion are arranged in a second diagonal direction crossing the first diagonal direction, and the crossed bangle shape is twisted so that a first end and a second end, which are opposite to each other in the second direction in the spread state, of the flexible display panel contact each other, and two portions of the flexible display panel cross each other to define two rings.

13. The electronic device of claim 12, wherein a distance between an intermediate point of the first and second projected points and an intermediate point of the third and fourth projected points corresponds to a substantially half of the second length.

14. The electronic device of claim 12, wherein an average of a distance between the first and fourth projected points and a distance between the second and third projected points corresponds to a substantially half of the second length.

15. A method for driving an electronic device, the method comprising:
   determining a crossed bangle operation of the electronic device comprising a flexible display panel, an input sensing panel, and a control module; and
   displaying an image on one portion of the flexible display panel, when the electronic device is determined as operating in the crossed bangle shape,
   wherein the control module determines that the crossed bangle operation is occurred, when four input points are sensed from the input sensing panel, a first projected point which is obtained by projecting a first input point of the four input points to the flexible display panel and a second projected point which is obtained by projecting a second input point of the four input points to the flexible display panel are arranged in a first diagonal direction, and a third projected point which is obtained by projecting a third input point of the four input points to the flexible display panel and a fourth projected point which is obtained by projecting a fourth input point of the four input points to the flexible display panel are arranged in a second diagonal direction crossing the first diagonal direction.

16. The method of claim 15, further comprising sensing a bending operation of the electronic device,
   wherein, when the bending operation of the electronic device is sensed, the crossed bangle operation of the electronic device is determined.

17. The method of claim 15, wherein when the first projected point of the first to fourth projected points is closest to the first end of the flexible display panel, the fourth projected point of the first to fourth projected points is closest to the second end of the flexible display panel, the one portion, on which the image is displayed, of the flexible display panel, comprises a first display portion defined from the first end of the flexible display panel to the first projected point, a second display portion defined from the second end of the flexible display panel to the fourth projected point, and a third display portion defined from the second projected point to the third projected point.

18. The method of claim 17, wherein the determining of the crossed bangle operation of the electronic device is performed in a repeated manner, and the first, second, and third display portions are defined on a basis of four input points which are newly sensed from the input sensing panel.

* * * * *